UNITED STATES PATENT OFFICE.

DANIEL E. CLARK, OF LYNN, MASSACHUSETTS.

PROCESS OF MAKING FERTILIZER.

1,268,683.      Specification of Letters Patent.      Patented June 4, 1918.

No Drawing.      Application filed July 18, 1917. Serial No. 181,393.

*To all whom it may concern:*

Be it known that I, DANIEL E. CLARK, a citizen of the United States, residing at Lynn, county of Essex, State of Massachusetts, have invented a certain new and useful Improvement in Processes of Making Fertilizer, of which the following is a specification.

My invention has for its object a method of making a material suitable for use as a fertilizer. The invention also includes the resulting fertilizing material itself. As is well known to those skilled in this art, leather contains a large amount of nitrogenous matter but this nitrogenous matter is in such condition that it has no immediate value as a fertilizer because it cannot be assimilated by plants even if it be comminuted or pulverized. To make the nitrogenous matter in leather available as a fertilizer, it has heretofore been necessary to rot it and this process takes years.

Another material containing considerable quantities of substances which are useful as fertilizers is dunder which is a form of distillery slop, being the residue which is left after the fermentation and distillation of molasses in the manufacture of rum, alcohol, etc. This waste product has heretofore been considered practically useless and its disposition has been a serious problem. It contains considerable quantities of potash as well as some nitrogen and other ingredients not necessary to be mentioned. I have discovered that leather may be treated with dunder and in effect rotted thereby with the result that the materials in the leather and in the dunder which are of a nature capable of becoming fertilizers are rapidly converted into materials which can be assimilated by plants. The final product combines the valuable ingredients, both of the leather and of the dunder.

In practising my improved process, I take a quantity of leather preferably in a comminuted form and immerse it in dunder. The leather is allowed to remain in the dunder for a sufficient length of time to cause a reaction to take place between the chemical contents of the dunder and the leather. After a sufficient length of time, ordinarily from ten to thirty days, the liquor is drawn off or evaporated and the solid residue dried in any suitable manner. This residue is then ground or pulverized and is found to be rich in nitrogen and in potash and the various ingredients which it contains are in a condition to be rapidly assimilated by plants.

The resulting compound may be used alone as a fertilizer or it may be compounded with other substances according to the particular use to which it is to be put.

As dunder itself is a waste product which has heretofore been thrown away and as leather scrap is inexpensive having been heretofore used as an adulterant of fertilizer, the hereindescribed method makes it possible to produce a valuable fertilizing material at relatively small cost.

Dunder varies considerably in its chemical composition but this has little or no effect on my improved process because more or less dunder can be used according to the requirements of the particular lot of leather being treated or the same dunder may be used over again and until it is exhausted.

What I claim is:

1. The method of making a fertilizing material which consists in treating leather with the liquor known as dunder.

2. The method of making a fertilizing material which consists in treating leather with the liquor known as dunder, then removing the water, and pulverizing the residue.

3. The fertilizing material produced by treating leather with the liquor known as dunder.

In testimony whereof I affix my signature.

DANIEL E. CLARK.

Copies of this patent may be obtained for five cents each, by addressing the "Commissioner of Patents, Washington, D. C."